United States Patent [19]
Roediger

[11] 4,369,111
[45] Jan. 18, 1983

[54] ACTIVATED SLUDGE SYSTEM
[75] Inventor: Markus Roediger, Stuttgart, Fed. Rep. of Germany
[73] Assignee: Techtransfer GmbH & Co. KG, Stuttgart, Fed. Rep. of Germany
[21] Appl. No.: 293,172
[22] Filed: Aug. 17, 1981
[30] Foreign Application Priority Data
Jul. 7, 1980 [DE] Fed. Rep. of Germany ....... 3025653
[51] Int. Cl.³ .............................................. C02F 3/20
[52] U.S. Cl. ................................. 210/199; 210/221.2; 210/258
[58] Field of Search ...................... 210/608, 221.2, 703, 210/220, 604, 626, 627, 622, 197, 195.3, 199, 200-202, 195.1, 258

[56] References Cited
U.S. PATENT DOCUMENTS 3,444,076  5/1969  Sekikawa et al. ................. 210/221.2
3,945,922  3/1976  Jagusch et al. ..................... 210/202
4,069,149  1/1978  Jackson ............................ 210/221.2
4,070,292  1/1978  Adams ................................. 210/220
4,071,443  1/1978  Gorski et al. ....................... 210/627
4,085,041  4/1978  Fullerton et al. ................... 210/626
4,274,959  6/1981  Roediger .......................... 210/221.2

Primary Examiner—Benoit Castel
Attorney, Agent, or Firm—Dennison, Meserole, Pollack & Scheiner

[57] ABSTRACT

In order to obtain a more intense and quicker sewage purification and a better retaining of the activated sludge flocks in an activated sludge system with aeration tank and subsequently arranged secondary settler, the aeration tank is constructed as a sealed pressure reservoir (10) to which oxygenous gas can be supplied under pressure for dissolution in water, where the secondary settler is a flotation basin (24) and the pressure from the pressure reservoir (10) is available for flotation.

2 Claims, 1 Drawing Figure

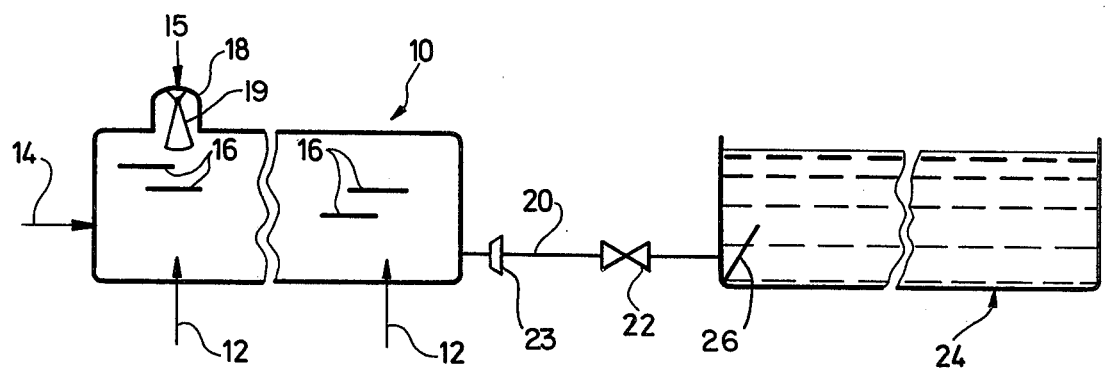

ACTIVATED SLUDGE SYSTEM

This invention relates to an activated sludge system with aeration tank and subsequently arranged secondary settler.

In the biological process of sewage purification one takes advantage of the property of bacteria to reduce dissolved or colloidal organic compounds. The oxygen required to this effect is supplied by artificial air supply.

On principle, activated sludge systems are composed of aeration tank and secondary settler. The usually pre-purified sewage is delivered to the aeration tank. Thereby the sewage is mixed with air in the aeration tank in order to provide the vital oxygen to the microorganism. A flocculence of activated sludge takes place. The organisms living in these flocks are reducing contaminants. The artificial delivery of oxygen to conventional open aeration tanks is done at static pressure, to sealed aeration tanks eventually at an extremely low overpressure. In the conventional systems the sewage with the activated sludge from the aeration tank is delivered to a secondary settler, where by settling a separation of the activated sludge flocks from the cleaned water takes place. This settling time will take some hours (approx. 2 to 3 hours). Thereby it is of importance that the required settling time is neither essentially exceeded nor fallen below. It is possible that the desired depositing of the activated sludge even cannot be obtained or not to the full extent as the rather light and not easily depositable flocks of activated sludge will overflow together with the sewage water running off.

It is the object of the present invention to develop an activated sludge system of the above mentioned kind in such a manner as to effect a more intense, quicker and better sewage purification coupled with an improved retaining of the flocks of activated sludge.

According to the invention this problem is solved in that the aeration tank is a sealed pressure reservoir, to which oxygenous gas can be admitted under pressure to be dissolved in water, and that the secondary settler is a flotation basin, where the pressure from the pressure reservoir can be used for flotation. In order to delay the escape of excess gas, the pressure reservoir preferably is provided with redans. In an embodiment of the invention, the pressure reservoir preferably is of tubular configuration, to which gas under pressure can be supplied at least at one point thereof.

Still another suggestion for dissolving the gas in the pressure reservoir excels by the fact that the gas to be dissolved can be added to water flowing in the pressure reservoir, preferably from the gas existing in the reservoir under pressure. In an embodiment for dissolving the gas in water, this can be led to an ejector.

Especially in order to obtain also an energetically optimum exploitation of the activated sludge system according to the invention, it is suggested to arrange a power generator 23 between the pressure reservoir and the flotation basin, which generator at least partially, is using the existing pressure difference. Preferably the power generator 23 forms a unit together with a detensioning means for reducing the pressure of the water delivered to the flotation basin. The power generator can be a turbine or similar apparatus.

The teaching according to the invention offers the advantage that the sewage to be biologically purified, as compared to conventional systems, will receive more oxygen by the artificial supply of gas effected under pressure. Consequently, the bacteria can reduce dissolved or colloidal organic compounds on a larger scale, i.e. by respiration or building-up characteristic substances. Since after the teaching according to the invention, as compared to the known activated sludge systems, more oxygen per water volume is made available and fully utilized without necessitating e.g. any supply of pure oxygen, the important advantages of the invention are quite obvious.

By designing the secondary settler as a flotation basin according to the invention, there is the further advantage that the thick sludge appearing on the surface of the sewage can be easily removed, e.g. with a scraper. On the other hand, the sludge removal presents many difficulties if conventional secondary settlers are used.

Further details, advantages and features of the invention will appear from the following description of the only FIGURE.

Sewage water precleaned in a conventional manner, via a conduit 14 flows into an aeration tank being designed as a pressure reservoir 10 according to the invention. Preferably the pressure reservoir 10 is of tubular construction and arranged either horizontally or vertically. If so desired, the longitudinal axis of the pressure reservoir 10 can also have an angle of inclination to the horizontal line. In order to dissolve oxygenous gas in the water present in the pressure reservoir 10, it is supplied through one or several points in the reservoir 10. In the figure drawing this is indicated by the arrows 12 by way of example. In order to lengthen the sojourn of the rising excess gas within the sewage water, retarding means (redans) 16 are arranged within the reservoir 10. Thereby the redans 16 can be configured as plates.

The oxygenous gas led in under pressure, however, can also be supplied to the pressure reservoir through feed conduits 15 arranged in the upper region of the reservoir. For example, the sewage water can be led in e.g. through a dome 18 arranged in the top region via an ejector 19 in the upper region of the pressure reservoir. At least the upper portion of the dome 18 is filled up with compressed air. The sewage water led through the ejector will now carry over oxygenous gas and thus arrives at the bottom region of the pressure reservoir 10. Even if only one dome 18 is shown in the embodiment figure, one can of course use several domes, too. This is dependent on how the oxygenous gas charge shall be effected.

From the aeration tank configured as pressure reservoir 10 the water enriched with dissolved gas, via a conduit 20 arrives at the secondary settler, here configured as flotation basin 24. In the conduit 20 are one or several pressure reducing valves 22. When flowing through the pressure reducing valve 22 a decrease of pressure takes place, by which gas bubbles are produced in the water in the flotation basin 24, which gas bubbles will capture particles and transport them to the water surface. Hereby a sludge film develops on the water surface, which can be removed e.g. with a scraper (not shown).

In an embodiment the water jet coming from the pressure reducing valve 22 can hit a diverting device 26 that can be configured as a plate. Thereby this plate should be disposed at an angle to the horizontal line. This will increase the distance between the plate and the wall provided with the inlet opening of the flotation basin 24 in the direction of the surface. The plate is diverting the water flowing from the tension reducing valve 22, which will cause a strong flotation effect already in that area of the flotation basin 24 adjacent to the mouth of the inlet opening.

In still another embodiment a power generator 23 as e.g. a turbine or the like can be arranged in the feed line 20, using at least partially the existing pressure difference between the pressure reservoir 10 and the flotation basin 24, without the flotation effect having to be influenced decisively during detensioning after the valve 22.

In an embodiment the power generator can form a unit together with the tension reducing valve/s.

Preferably the internal pressure of the pressure reservoir 10 should be 4 to 4.5 bars, so that the oxygenous gas supplied through the conduit 12 indicated as an example, must have a higher pressure that it can be dissolved in the water.

I claim:

1. In an activated sludge system comprising an aeration tank and a secondary settler reservoir, the improvement comprising the aeration tank being a generally sealed pressure reservoir (10) having means (14) for introducing sewage water therein, and including means (12) located in the bottom wall of said pressure reservoir (10) for independently introducing oxygenous gas under pressure at the bottom of said pressure reservoir to be dissolved in sewage water contained in said pressure reservoir (10) and further including means (16) positioned intermediate the bottom and top of said pressure reservoir (10) for delaying the upward traversal of the oxygenous gas through the sewage water contained in pressure reservoir (10), and having a dome (18) including means (15) for introducing sewage water therein, said dome containing oxygenous gas and an ejector (19) for simultaneously blending under pressure the oxygenous gas contained in said dome and said sewage water introduced therein and directly introducing this mixture into said pressurized reservoir (10) and further including conduit means (20), power generator (23), and pressure reducing valve (22), intermediate said pressure reservoir (10) and settler reservoir (24), said secondary settler reservoir being a flotation basin (24) including means (26) disposed at an angle to the horizontal of said basin (24) for diverting the water flowing from pressure reducing valve (22) and into said basin to effect upwardly flowing currents within said secondary settler reservoir, said power generator (23) partially driven by the existing fluid pressure difference between the pressure reservoir and flotation basin for providing oxygenous gas bubbles to the sewage water and conduit (20), and means for utilizing the pressurized oxygenous sewage water from the pressure reservoir to provide gas bubbles in the secondary settler reservoir for flotation of sludge.

2. An activated sludge system according to claim 1 wherein the pressure reservoir (10) is of tubular configuration.

* * * * *